US012743773B2

(12) United States Patent
Sullivan et al.

(10) Patent No.: US 12,743,773 B2
(45) Date of Patent: Sep. 22, 2026

(54) METHOD AND APPARATUS FOR DETERMINING MID-SAGITTAL PLANE IN MAGNETIC RESONANCE IMAGES

(71) Applicant: KOH YOUNG TECHNOLOGY INC., Seoul (KR)

(72) Inventors: Kenneth Mark Sullivan, San Diego, CA (US); Jaedu Cho, San Diego, CA (US); Xing Zheng, San Diego, CA (US); Jin Man Kang, San Diego, CA (US)

(73) Assignee: KOH YOUNG TECHNOLOGY INC., Seoul (KR)

( * ) Notice: Subject to any disclaimer, the term of this patent is extended or adjusted under 35 U.S.C. 154(b) by 328 days.

(21) Appl. No.: 18/474,655

(22) Filed: Sep. 26, 2023

(65) Prior Publication Data

US 2024/0013393 A1 Jan. 11, 2024

Related U.S. Application Data

(63) Continuation of application No. 17/104,659, filed on Nov. 25, 2020, now Pat. No. 11,798,161.

(Continued)

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/10088* (2013.01); *G06T 2207/30016* (2013.01)

(58) Field of Classification Search
None
See application file for complete search history.

(56) References Cited

U.S. PATENT DOCUMENTS 11,798,161 B2 * 10/2023 Sullivan .................... G06T 7/68
2008/0071163 A1 3/2008 Zhang et al.
(Continued)

FOREIGN PATENT DOCUMENTS

CN 104318009 1/2015
CN 108961292 12/2018
(Continued)

OTHER PUBLICATIONS

Liu, Yuan, and Benoit M. Dawant. "Automatic localization of the anterior commissure, posterior commissure, and midsagittal plane in MRI scans using regression forests." IEEE journal of biomedical and health informatics 19.4 (2015): 1362-1374. (Year: 2015).*

(Continued)

*Primary Examiner* — Samah A Beg
(74) *Attorney, Agent, or Firm* — KILE PARK REED & HOUTTEMAN PLLC

(57) ABSTRACT

A method, performed by a computer, for volumetrically determining a mid-sagittal plane (MSP) from a plurality of magnetic resonance (MR) images of a brain is disclosed. The plurality of MR images is received and converted into a 3D volume image defined in a 3D coordinate space. Semantic segmentation of an anterior commissure (AC) region, a posterior commissure (PC) region, and a third ventricle region in the 3D volume image is performed based on a pre-trained segmentation model to generate a 3D mask image labeled with the AC region, the PC region, and the third ventricle region. Based on the labeled 3D mask image, a 3D volumetric image of the segmented third ventricle region is constructed. The MSP is determined based on the 3D volumetric image of the third ventricle region.

23 Claims, 16 Drawing Sheets

Related U.S. Application Data

(60) Provisional application No. 62/940,576, filed on Nov. 26, 2019.

(56) References Cited

U.S. PATENT DOCUMENTS

| | | | |
|---|---|---|---|
| 2008/0285829 A1 | 11/2008 | Wang et al. | |
| 2009/0093706 A1 | 4/2009 | Zhang et al. | |
| 2010/0074495 A1* | 3/2010 | Geiger | G06T 7/75 382/131 |
| 2010/0172566 A1 | 7/2010 | Goto | |
| 2010/0290689 A1 | 11/2010 | Gupta et al. | |
| 2013/0163841 A1 | 6/2013 | Geiger | |
| 2014/0233824 A1 | 8/2014 | Geiger | |
| 2016/0292847 A1 | 10/2016 | Liu et al. | |
| 2017/0061650 A1 | 3/2017 | Liu et al. | |
| 2019/0311478 A1 | 10/2019 | Avendi et al. | |
| 2020/0037962 A1* | 2/2020 | Shanbhag | A61B 5/7267 |

FOREIGN PATENT DOCUMENTS

| | | | |
|---|---|---|---|
| EP | 3 298 968 | 3/2018 | |
| EP | 3298968 A1 * | 3/2018 | A61B 34/10 |
| JP | H06-337920 | 12/1994 | |
| JP | 2012-503500 | 2/2012 | |
| JP | 2012-139260 | 7/2012 | |
| KR | 10-2017-0116100 | 10/2017 | |
| KR | 10-2019-0028422 | 3/2019 | |
| WO | 2005/048844 | 6/2005 | |
| WO | 2006/028416 | 3/2006 | |
| WO | 2019/141748 | 7/2019 | |

OTHER PUBLICATIONS

Carass, Aaron, et al. "Whole brain parcellation with pathology: Validation on ventriculomegaly patients." Patch-Based Techniques in Medical Imaging: Third International Workshop, Patch-MI 2017, Quebec City, QC, Canada, Sep. 14, 2017, Proceedings 3. Springer International Publishing, 2017. (Year: 2017).*

Yan Xia et al., "A knowledge-driven algorithm for a rapid and automatic extraction of the human cerebral ventricular system from MR neuroimages", NeuroImage, 21 (2004) pp. 269-282.

Zeynettin Akkus et al., "Deep Learning for Brain MRI Segmentation: State of the Art and Future Directions", J Digit Imaging (2017) 30; pp. 449-459.

Aaron Carass et al., "Whole Brain Parcellation with Pathology: Validation on Ventriculomegaly Patients", Whole Brain Parcellation with Pathology, 2017, pp. 20-28.

Extended European Search Report, corresponding to European Application No./Patent No. 20209966.9, dated Apr. 16, 2021.

Japanese Office Action with English translation for Japanese Patent Application No. 2020-195773, dated Oct. 5, 2021.

Khagi Bijen et al., "Pixel-Label-Based Segmentation of Cross-Sectional Brain MRI Using Simplified SegNet Architecture-Based CNN", Hindawi Journal of Healthcare Engineering vol. 2018; pp. 1-8.

Korean Office Action, corresponding to Korean Application No. 10-2020-0159924, dated May 2, 2022.

Korean Office Action with English translation for Korean Patent Application No. 10-2020-0159924, dated Oct. 31, 2022.

Chinese Office Action, with English Translation, for Chinese Application No. 2020113457523, dated Aug. 30, 2023.

Extended European Search Report for European Application No. 23205689.5, dated Jan. 18, 2024.

Yan-qi et al, Evaluation of craniofacial midsagittal plane selection based on cone beam computed tomography, Beijing Journal of Stomatology, Oct. 2013, vol. 21, No. 5.

Chinese Office Action with English translation for Chinese Patent Application No. 202011345752.3, dated Mar. 30, 2024.

European Office Action dated Feb. 20, 2026, in European Patent Application No. 23 205 689.5.

* cited by examiner

FIG. 7

Labeled 3D Mask Image

3D Blob Construction Unit — 710

MSP Estimation Unit — 720

MSP Output Unit — 730

MSP Information

METHOD AND APPARATUS FOR DETERMINING MID-SAGITTAL PLANE IN MAGNETIC RESONANCE IMAGES

CROSS-REFERENCE TO RELATED APPLICATION

This is a continuation of U.S. patent application Ser. No. 17/104,659, filed Nov. 25, 2020 (now pending), the disclosure of which is incorporated herein by reference in its entirety. U.S. patent application Ser. No. 17/104,659 claims priority to and benefit from U.S. Provisional Patent Application No. 62/940,576, filed Nov. 26, 2019, the entire contents of which are incorporated herein by reference.

TECHNICAL FIELD

The present disclosure relates generally to magnetic resonance imaging, and more specifically to, determining a mid-sagittal plane in magnetic resonance images of a brain.

The present disclosure is derived from a study conducted as part of the technical development support of the WC300 project of the Korean Ministry of SMEs and Startups.

[Project No.: S2482672, Project Title: Development of a surgical navigation fusion head and neck surgical robot system with a matching accuracy of 1 mm or less]

BACKGROUND

The brain is considered to be the most complex organ in the human body. As such, when a surgery requiring access to internal portions of a patient's brain becomes necessary, doctors typically conduct a path planning before the surgery to plan for exact placement on the scalp and insertion of surgical instruments into the brain. For example, in the case of a deep brain stimulation surgery to treat Parkinson's disease, surgical instruments such as electrodes may be inserted into the patient's brain for applying electrical impulses to target areas in the brain during the surgery.

During path planning, magnetic resonance (MR) images of the patient's brain may be shown to doctors on a computer display along with a means for selecting the anterior commissure (AC) and posterior commissure (PC) in the brain. The AC and PC are bundles of nerve tissues connecting the two hemispheres of the brain. As such, the AC and PC are often used as anatomical landmarks or a frame of reference in brain imaging to assist doctors in accurately identifying a target area in the brain and determining a location, an angle, depth, or the like for inserting a surgical instrument into the brain.

In a conventional method, a doctor may review the MR images of the brain and manually determine a center plane of the brain to align the images to the estimated plane. Such a center plane is also referred to as a midline (ML) plane, a midplane, or a mid-sagittal plane (MSP), and may be used as a landmark during a path planning for a surgical procedure. However, manually determining the MSP can be time consuming, thereby prolonging the path planning process. Further, the manually determined MSP may differ substantially from one doctor to another or may not be sufficiently accurate.

SUMMARY

The present disclosure provides a method and apparatus for volumetrically determining a mid-sagittal plane based on a 3D mask image of an AC region, a PC region, and a third ventricle region.

According to one aspect of the present disclosure, a method, performed by a computer, for volumetrically determining a mid-sagittal plane (MSP) from a plurality of magnetic resonance (MR) images of a brain is disclosed. In this method, the plurality of MR images is received and converted into a 3D volume image defined in a 3D coordinate space. Semantic segmentation of an anterior commissure (AC) region, a posterior commissure (PC) region, and a third ventricle region in the 3D volume image is performed based on a pre-trained segmentation model to generate a 3D mask image labeled with the AC region, the PC region, and the third ventricle region. Based on the labeled 3D mask image, a 3D volumetric image of the segmented third ventricle region is constructed. The MSP is determined based on the 3D volumetric image of the third ventricle region.

According to another aspect of the present disclosure, an image processing device for volumetrically determining an MSP from a plurality of MR images of a brain is disclosed. The image processing device includes a processor configured to: receive the plurality of MR images; convert the plurality of MR images into a 3D volume image defined in a 3D coordinate space; perform semantic segmentation of an anterior commissure (AC) region, a posterior commissure (PC) region, and a third ventricle region in the 3D volume image based on a pre-trained segmentation model to generate a 3D mask image labeled with the AC region, the PC region, and the third ventricle region; construct a 3D blob of the segmented third ventricle region based on the labeled 3D mask image; and determine the MSP based on the 3D blob of the third ventricle region.

According to yet another aspect of the present disclosure, a non-transitory computer-readable storage medium including instructions for volumetrically determining an MSP from a plurality of MR images of a brain is disclosed. The instructions cause a processor to perform operations including: receiving the plurality of MR images of the brain; converting the plurality of MR images into a 3D volume image defined in a 3D coordinate space; performing semantic segmentation of an anterior commissure (AC) region, a posterior commissure (PC) region, and a third ventricle region in the 3D volume image based on a pre-trained segmentation model to generate a 3D mask image labeled with the AC region, the PC region, and the third ventricle region; constructing a 3D volumetric image of the segmented third ventricle region based on the labeled 3D mask image; and determining the MSP based on the 3D volumetric image of the third ventricle region.

In one embodiment, semantic segmentation of the 3D volume image may be performed by: normalizing a plurality of pixels of each of a plurality of slices of the 3D volume image to intensity values within a predetermined range; extracting a set of the plurality of pixels from a center region of interest in each of the plurality of slices of the 3D volume image; segmenting the AC region, the PC region, and the third ventricle region of the normalized and extracted 3D volume image based on the pre-trained segmentation model to generate the 3D mask image labeled with the AC region, the PC region, and the third ventricle region; determining a center of mass for each of the AC region and the PC region in the 3D mask image; and labeling an AC point corresponding to the center of mass of the AC region as the AC region and a PC point corresponding to the center of mass of the PC region as the PC region in the 3D mask image.

In one embodiment, determining the MSP may include determining a candidate plane that symmetrically divides the 3D volumetric image of the third ventricle region based on a skeleton of the 3D volumetric image of the third ventricle region and designating the candidate plane as the MSP.

In one embodiment, information indicative of the MSP and the 3D mask image labeled with the AC region, the PC region, and the third ventricle region may be output.

In one embodiment, the information indicative of the MSP may be an equation or a set of coordinates defining the MSP.

In one embodiment, the set of coordinates defining the MSP may include a first coordinate indicative of the AC region, a second coordinate indicative of the PC region, and a third coordinate indicative of a point that defines the MSP with the first and second coordinates.

In one embodiment, the first coordinate indicative of the AC region may correspond to a center of mass of the AC region and the second coordinate indicative of the PC region may correspond to a center of mass of the PC region.

In one embodiment, determining the MSP may include: dividing the 3D volumetric image of the third ventricle region into a first portion and a second portion by a candidate plane starting from a skeleton of the 3D volumetric image of the third ventricle region; determining whether the candidate plane symmetrically divides the 3D volumetric image based on a shape and a number of voxels in the first portion and a shape and a number of voxels of the second portion; and upon determining that the candidate plane symmetrically divides the 3D volumetric image, designating the candidate plane as the MSP.

In one embodiment, the candidate plane may be aligned to a line connecting the AC region and the PC region.

In one embodiment, determining the MSP may include sequentially dividing the 3D volumetric image of the third ventricle by a plurality of candidate planes starting from a skeleton of the 3D volumetric image of the third ventricle region until one of the plurality of candidate planes is determined to symmetrically divide the 3D volumetric image of the third ventricle region and designating the one of the plurality of candidate planes as the MSP.

BRIEF DESCRIPTION OF DRAWINGS

The accompanying drawings, which are incorporated in and constitute a part of the specification, illustrate embodiments of the present disclosure.

FIG. 7 shows a block diagram of an MSP detection unit configured to determine a mid-sagittal plane from a labeled 3D mask according to an embodiment of the present disclosure.

FIG. 8D shows an exemplary slice of a 3D volume image and an exemplary MSP as determined by an MSP estimation unit according to an embodiment of the present disclosure.

DETAILED DESCRIPTION

Figure 1:
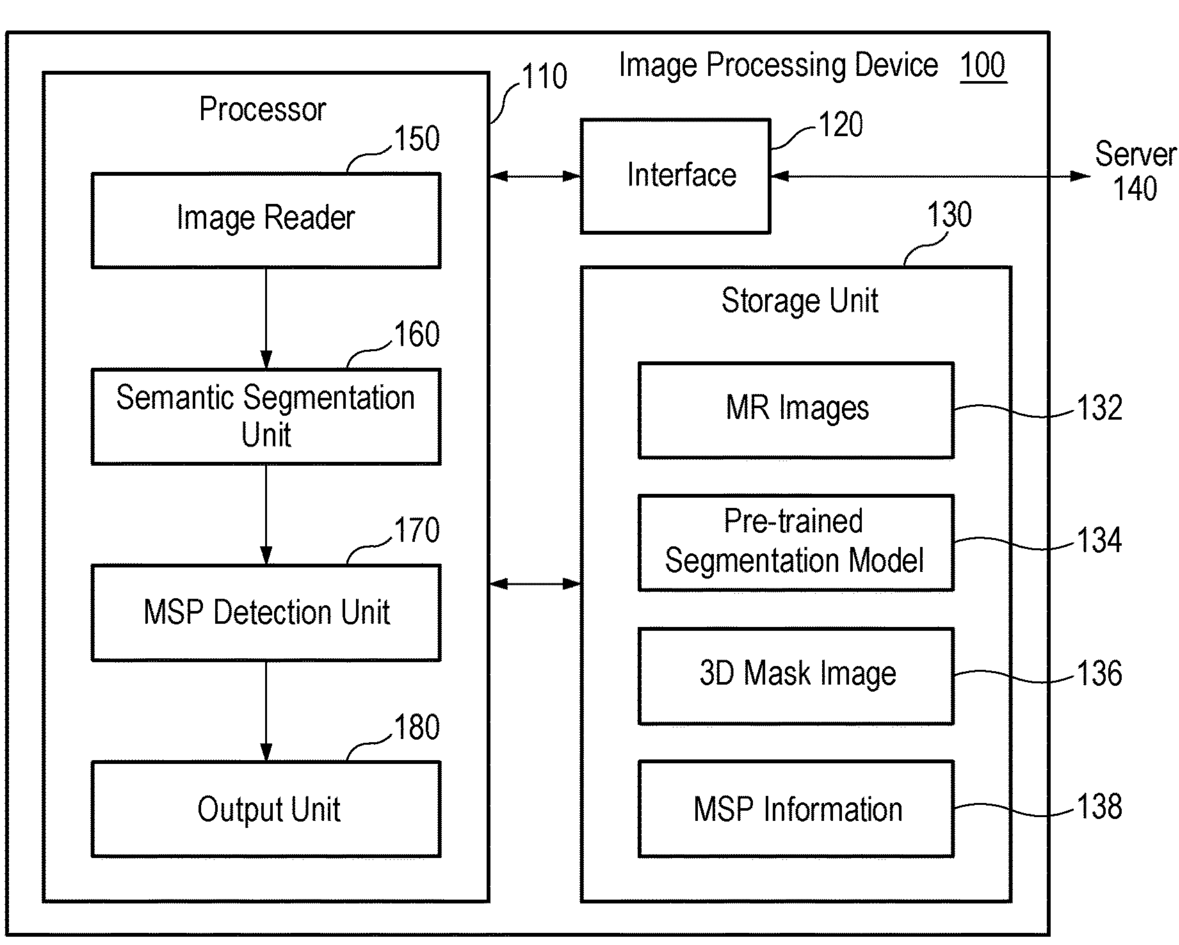
FIG. 1 illustrates a block diagram of an image processing device configured to volumetrically determine a mid-sagittal plane from a plurality of magnetic resonance (MR) images of a brain according to an embodiment of the present disclosure.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

All technical or scientific terms used herein have meanings that are generally understood by a person having ordinary knowledge in the art to which the present disclosure pertains, unless otherwise specified. The terms used herein are selected for only more clear illustration of the present disclosure, and are not intended to limit the scope of claims in accordance with the present disclosure.

A singular expression can include meanings of plurality, unless otherwise mentioned, and the same is applied to a singular expression stated in the claims.

As used herein, the term "unit" means a software component or hardware component, such as a field-programmable gate array (FPGA) and an application specific integrated circuit (ASIC). However, a "unit" is not limited to software and hardware, and it may be configured to be an addressable storage medium or may be configured to run on one or more processors. For example, a "unit" may include components, such as software components, object-oriented software components, class components, and task components, as well as processors, functions, attributes, procedures, subroutines, segments of program codes, drivers, firmware, micro-codes, circuits, data, databases, data structures, tables, arrays, and variables. Functions provided in components and "unit" may be combined into a smaller number of components and "units" or further subdivided into additional components and "units."

The term "based on" used herein is used to describe one or more factors that influence a decision, an action of judgment or an operation described in a phrase or sentence including the relevant expression, and this expression does not exclude additional factor influencing the decision, the action of judgment or the operation.

As used herein, the term "region" means one or more points, pixels, or voxels and may include a space, an area, or a volume corresponding to one or more continuous or contiguous points, pixels, or voxels within its meaning. The term "label" in its noun form refers to an annotation, word, name, marker, designation, color, boundary, shape, tag, or the like that is indicative of an object, structure, feature, or the like, and the term "label" in its verb form refers to an act of marking, annotating, affixing, or indicating an object, structure, feature, or the like with a label.

As shown herein, some of the images or screenshots in the drawings may have been modified in scale, brightness, contrast, or the like in order to improve visual characteristics for ease of illustration and description, and thus may not correspond entirely to original images.

Hereinafter, embodiments of the present disclosure will be described with reference to the accompanying drawings. In the accompanying drawings, like or relevant components are indicated by like reference numerals. In the following description of embodiments, repeated descriptions of the identical or relevant components will be omitted. However, even if a description of a component is omitted, such a component is not intended to be excluded in an embodiment.

FIG. 1 illustrates a block diagram of an image processing device 100 configured to volumetrically determine a mid-sagittal plane (MSP) from a plurality of magnetic resonance (MR) images 132 of a brain according to an embodiment of the present disclosure. As used herein, the term "mid-sagittal plane" or "MSP" may also be referred to as a midline (ML) plane or a mid-plane that may serve as a landmark or reference plane for structures or features in the brain. The image processing device 100 includes a processor 110, an interface 120, and a storage unit 130. The storage unit 130 may store the plurality of MR images 132 (e.g., tomography) of the brain and a pre-trained segmentation model 134. In one embodiment, the MR images 132 may be received from an external picture archiving and communications system (PACS) via the interface 120 through a server 140 and stored in the storage unit 130 for processing or provided directly to the processor 110. The MR images 132 may, for example, be received and stored in a DICOM image format.

The pre-trained segmentation model 134 may include one or more segmentation models that have been pre-trained with reference MR brain images labeled with AC, PC, and third ventricle and thus may be optimized to detect AC, PC, and third ventricle regions in MR images. In one embodiment, the pre-trained segmentation model may implement any suitable 2D or 3D convolutional neural networks and may be trained with one or more sets of MR brain images such that model parameters of the neural networks are configured to detect AC, PC, and third ventricle regions.

The interface 120 may be any suitable interface capable of providing interface with the server 140 through a network or any other computing devices, applications, or programs, and may include a software (S/W) interface, a hardware (H/W) interface, or a combination thereof. For example, the interface 120 may be implemented as an application programming interface (API) or a dynamic-link library (DLL) configured to provide software interface for the image processing device 100.

In the illustrated embodiment, the image processing device 100 may be connected to the server 140 via a network and receive a request from the server 140 via the interface 120. The request from the server 140 may include a request for MR image data relating to the brain of a specified patient. In response, the image processing device 100 may generate a 3D mask image labeled with AC, PC, and third ventricle regions for the MR images and volumetrically determine the MSP by constructing a 3D volumetric image of a segmented third ventricle region.

The processor 110 includes an image reader 150, a semantic segmentation unit 160, an MSP detection unit 170, and an output unit 180. The processor 110 may be coupled to communicate with the interface 120 and the storage unit 130 as described above. Initially, the image reader 150 may receive a request for MR image data via the interface 120 from the server 140 and access the MR images 132 from the storage unit 130. The image reader 150 may format the MR images 132, which may be original MR images in a DICOM image format, into a format suitable for volumetric processing. For example, the image reader 150 may convert the MR images 132 into a 3D volume image in a 3D coordinate space (e.g., a 3D Cartesian coordinate system defined in x, y, and z axes) by using a suitable mapping and/or transformation method and performing bilinear and/or tri-linear interpolation.

The image reader 150 provides the 3D volume image to the semantic segmentation unit 160 for volumetric processing. The semantic segmentation unit 160 in the processor 110 is configured to detect and label the AC, PC, third ventricle regions in the 3D volume image based on the pre-trained segmentation model 134 accessed from the storage unit 130, and generate a 3D mask image 136 labeled with the AC, PC, and third ventricle regions. The semantic segmentation unit 160 may then provide the 3D mask image 136 to the MSP detection unit 170 and the image output unit 180 for generating a reply to the server 140.

Based on the received 3D mask image 136, the MSP detection unit 170 constructs a 3D volumetric image (e.g., a 3D blob) of the segmented third ventricle region. According to one embodiment, the MSP detection unit 170 then iteratively and sequentially applies one or more candidate planes to divide (e.g., cut, partition, or bisect) the 3D volumetric image of the segmented third ventricle region in two portions starting from a candidate plane corresponding to a skeleton (e.g., a major axis plane) of the 3D volumetric image of the segmented third ventricle region, until one of the candidate planes is determined to symmetrically divide the 3D volumetric image. For each candidate plane, the MSP detection unit 170 may determine whether the candidate plane divides the volumetric image of the third ventricle region symmetrically into two symmetrical portions. Upon determining that a candidate plane divides the volumetric image symmetrically, the MSP detection unit 170 may designate the candidate plane as the MSP and provide plane information indicative of the MSP (i.e., MSP information 138) to the output unit 180. In one embodiment, the output unit 180 may generate a reply to the request from the server 140 that includes the MSP information 138 and the 3D mask image 136, and transmit the reply via the interface 120. Additionally, the output unit 180 may store the MSP information 138 and the 3D mask image 136 in the storage unit 130.

Figure 2:
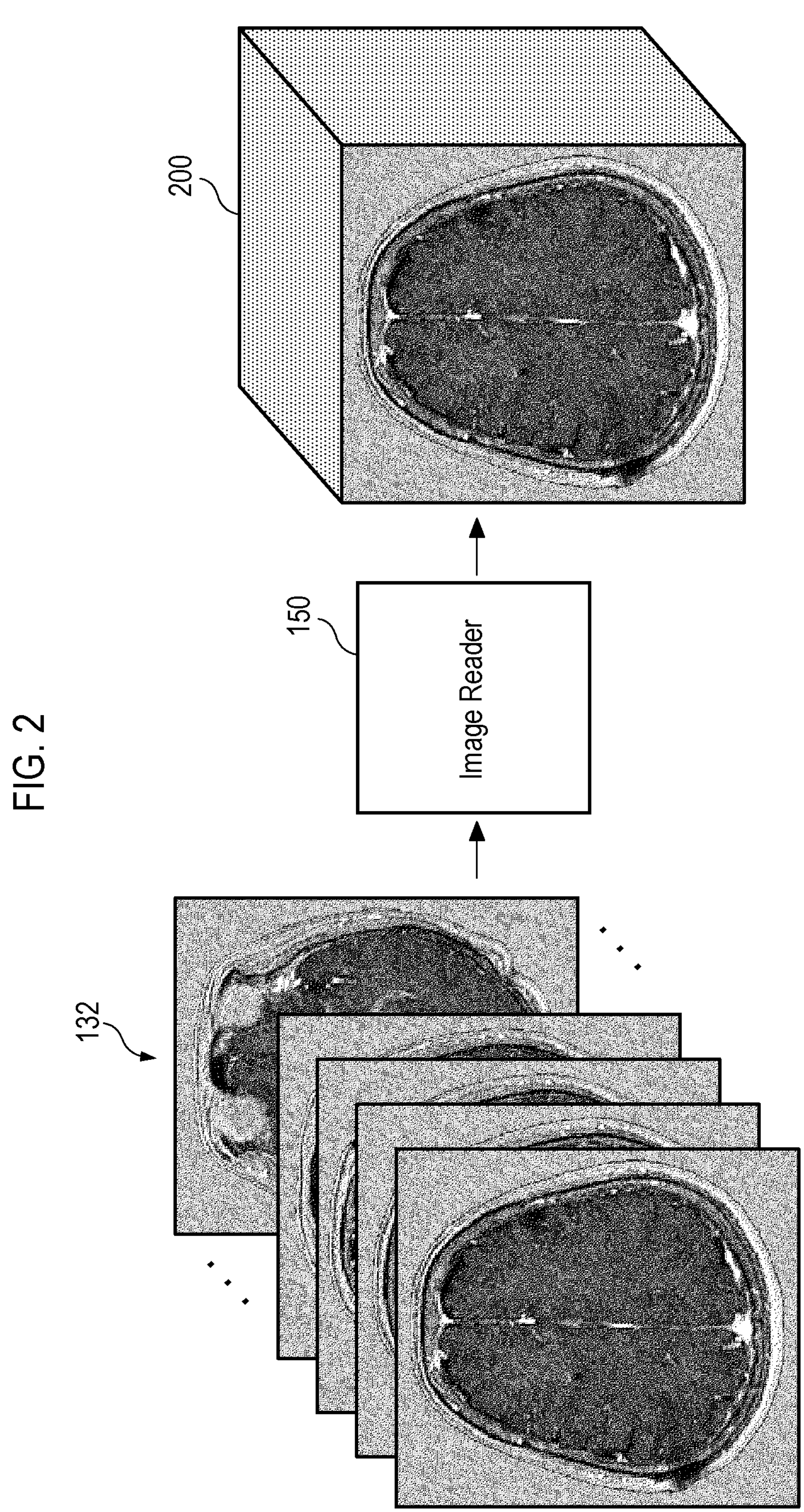
FIG. 2 shows a block diagram of an image reader configured to convert a plurality of MR images into a 3D volume image according to an embodiment of the present disclosure.

FIG. 2 shows a block diagram of the image reader 150 configured to receive the plurality of MR images 132 and output a 3D volume image 200 according to one embodiment of the present disclosure. The MR images 132 may be tomography images. In one embodiment, the plurality of MR images 132 may be T1 weighted images but may also be T2 weighted images.

Upon receiving the request for MR image data from the server 140, the image reader 150 may access the MR images 132 from the storage unit 130 and format the MR images 132 into a format suitable for volumetric processing by converting the MR images 132, which may, for example, be in a DICOM format, into the 3D volume image 200 in a 3D coordinate system (e.g., Talairach coordinate system, world coordinate system, MNI coordinate system, or the like) used in the image processing device 100. In this process, the original MR images 132 may be stacked and interpolation (e.g., bi-linear or tri-linear interpolation) may be performed to generate the 3D volume image 200, which may be stored in the storage unit 130. The image reader 150 then provides the 3D volume image 200 to the semantic segmentation unit 160.

In one embodiment, the image reader 150 may construct the 3D volume image 200 by mapping the MR images 132 to x and y coordinate planes in the 3D coordinate space and stacking the MR images 132 in the orthogonal z-axis direction. To fill in gaps in the 3D volume image 200, interpolation may be performed using the pixels (e.g., intensity and location) of the stacked MR images 132 to generate pixels or voxels (e.g., intensity and location) of the 3D volume image 200. In this manner, the 3D volume image 200 of the original MR images 132 may be constructed in the 3D coordinate space.

Figure 3:
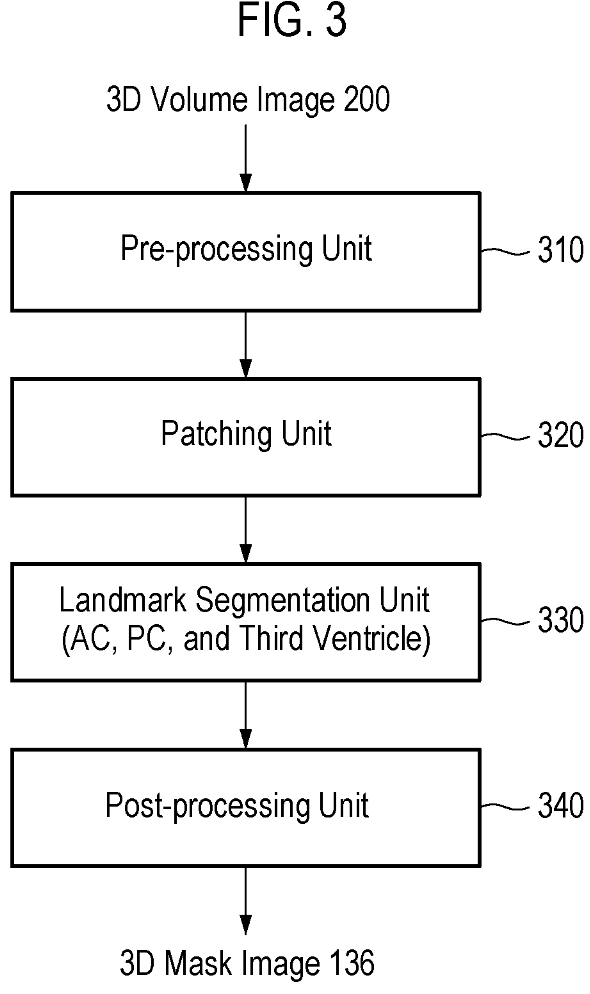
FIG. 3 illustrates a block diagram of a semantic segmentation unit configured to segment AC, PC, and third ventricle regions in a 3D volume image of a brain according to an embodiment of the present disclosure.

FIG. 3 illustrates a block diagram of the semantic segmentation unit 160 configured to segment AC, PC, and third ventricle regions in the 3D volume image 200 according to an embodiment of the present disclosure. The semantic segmentation unit 160 includes a pre-processing unit 310, a patching unit 320, a landmark segmentation unit 330, and a post-processing unit 340. In some embodiments, the pre-processing unit 310 and/or the patching unit 320 are optional units and may be omitted in the semantic segmentation unit 160.

The pre-processing unit 310 may be configured to enhance display characteristics of the 3D volume image 200. For example, since the pixels of original MR images 132 generally have relatively narrow intensity values (e.g., in a range of 70 to 80), the 3D volume image 200 generated from the MR images 132 may appear dark. To enhance image characteristics, the pre-processing unit 310 may enhance the 3D volume image 200 by normalizing the intensity values of the pixels in the 3D volume to gray-scale or color intensity values of a predetermined range (e.g., 255 values). In one embodiment, each of the slices in the 3D volume image may be normalized such that image characteristics of the slices in the 3D volume image 200 may be enhanced in terms of, for example, brightness, contrast, etc.

Further, the patching unit 320 may receive the normalized 3D volume image 200 and perform a patching operation. In this process, the pixels from a center region-of-interest (ROI) in each of the slices of the 3D volume image 200 that are necessary for performing semantic segmentation may be extracted to form the 3D volume image 200 for subsequent segmentation processing. The size of the center ROI or the number of pixels therein may be determined based on a percentage of the volume that can fit within the neural network of the pre-trained segmentation model 134. In one embodiment, the percentage of the data samples (i.e., pixels or voxels) that are extracted may be between 2 to 98% of the load capacity of the neural network. Using only the extracted pixels of center ROIs from the original 3D volume image 200 reduces the size of the 3D volume and thus improves processing load and speed.

In one embodiment, the extracted 3D volume image 200 may also be filtered to output one of a plurality of output image types. For example, a plurality of output processing schemes may be provided such as an auto adjust mode (e.g., to adjust the image to a desired range), a slice histogram equalization mode, a 3D histogram equalization mode, and a slice adaptive histogram equalization mode. Any one of the four modes or a combination thereof may be selected and applied to the 3D volume image 200 to improve visual characteristics of the image.

The landmark segmentation unit 330 is configured to receive the 3D volume image 200 (e.g., the extracted ROI volume image of the 3D volume image 200) from the patching unit 320, and detect and segment the AC, PC, and third ventricle regions to generate the 3D mask image 136. In this process, the landmark segmentation unit 330 detects and segments the AC, PC, and third ventricle regions by using the pre-trained segmentation model 134. For example, a neural network such as U-Net, MNET, or the like may be used to generate the pre-trained segmentation model 134, which may be used to detect and segment the AC, PC, and third ventricle regions. Although the landmark segmentation unit 330 is described as performing segmentation of AC, PC, and third ventricle regions simultaneously, segmentation of the AC and PC regions may be performed separately from segmentation of the third ventricle region. For example, the landmark segmentation unit 330 may segment the AC and PC regions first and then segment the third ventricle region.

In one embodiment, the landmark segmentation unit 330 may use the pre-trained segmentation model 134 to sequentially or simultaneously perform semantic segmentation on one or more slices of the 3D volume image 200 to generate the 3D mask image 136 labeled with the AC, PC, and third ventricle regions. For example, pixels in the 3D coordinate space of the 3D volume image 200 may be labeled with labels indicating correspondence to the AC region (e.g., red color or “1”), the PC region (e.g., green color or “2”), and the third ventricle region (e.g., blue color or “3”), or no correspondence (e.g., original pixel value or “0”) to generate the 3D mask image 136.

The post-processing unit 340 may receive the 3D mask image 136 from the landmark segmentation unit 330 and determine a center of mass of each of the detected AC and PC regions. In this process, a center of mass for the segmented AC region and a center of mass for the PC region may be determined from the 3D mask image 136. Instead of labeling each of the AC and PC regions as an area consisting of multiple points or pixels, the post-processing unit 340 may designate and label a single point (e.g., pixel or voxel) corresponding to the center of mass for each of the AC and PC regions as the AC and the PC. In the case of the third ventricle region, a center of mass need not be determined so that the entire segmented region of the third ventricle may remain in the 3D mask image. In addition, the post-processing unit 340 may convert the labeled 3D mask image 136 back to the original 3D coordinate space.

Figure 4A:
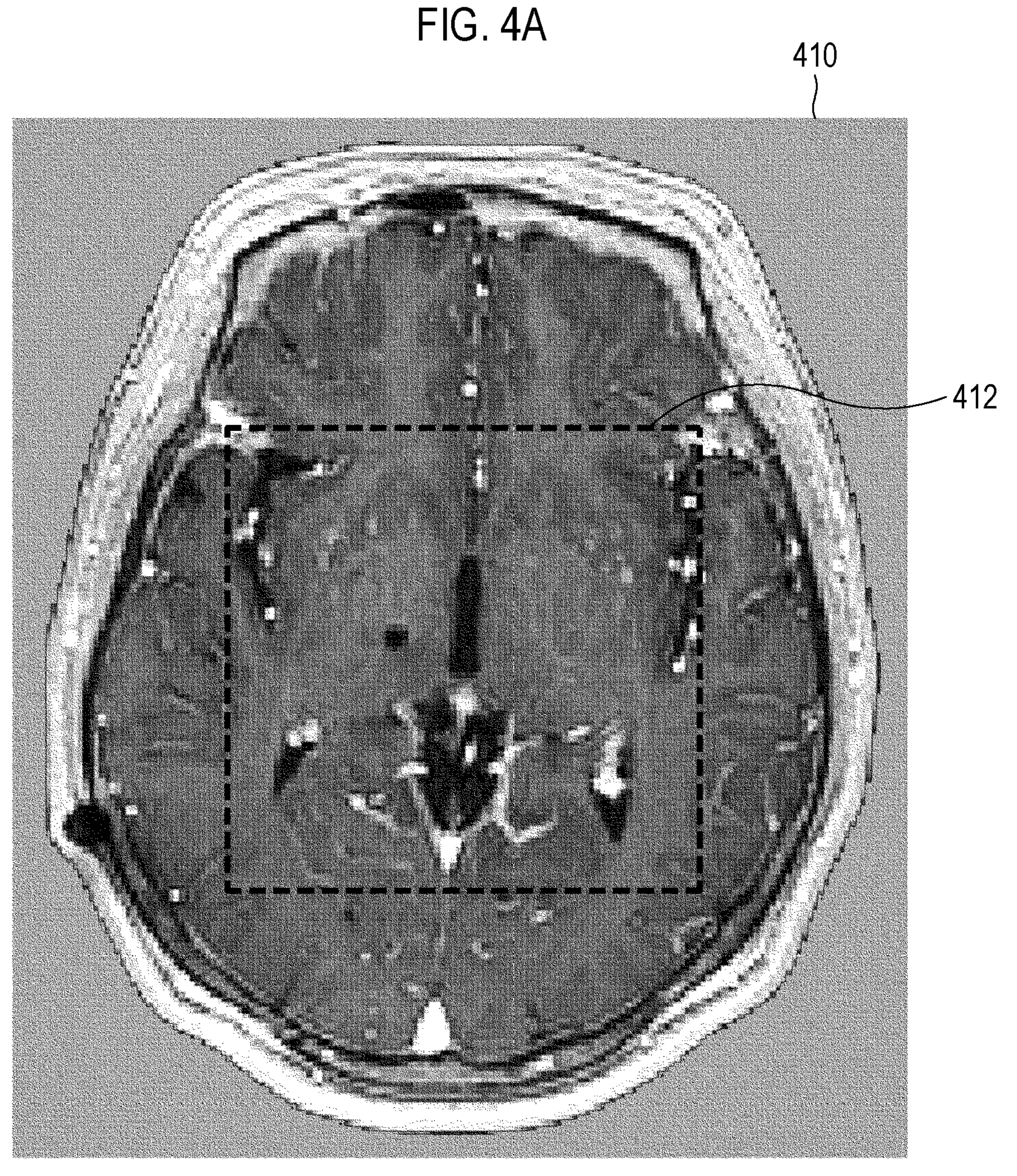
FIGS. 4A to 4C illustrate exemplary slices of a 3D volume image that may be processed in a semantic segmentation unit according to an embodiment of the present disclosure.
Figure 4B:
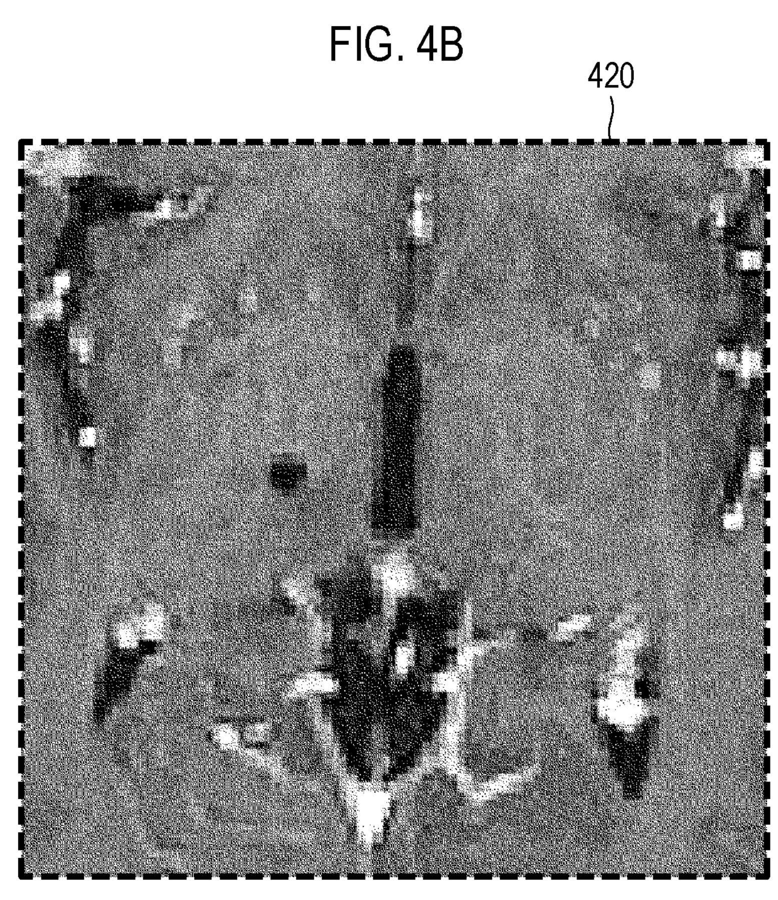
Figure 4C:
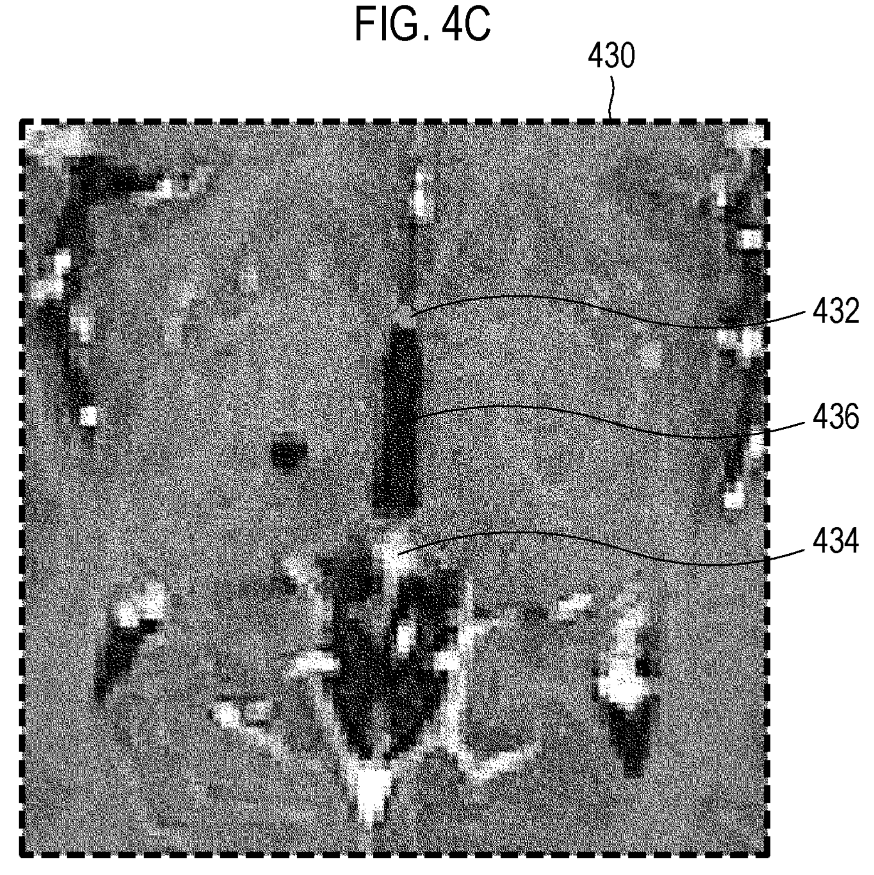

FIGS. 4A to 4C illustrate exemplary slices 410, 420, and 430 of the 3D volume image 200 that may be processed in the semantic segmentation unit 160 according to an embodiment of the present disclosure. FIG. 4A shows an exemplary slice 410 of the 3D volume image 200 that has been pre-processed by the pre-processing unit 310 according to an embodiment of the present disclosure. As shown, the slice 410 may be a slice from an axial plane of the 3D volume image 200 and the image of the slice 410 has been normalized to enhance image characteristics such as brightness, contrast, or the like. To facilitate description, an ROI 412 indicated by a dotted line of a rectangular shape is shown in the slice 410 and indicates the region in the slice 410 that may be extracted by the patching unit 320. FIG. 4B shows an exemplary slice 420 that has been extracted from the ROI 412 in the slice 410 by the patching unit 320.

FIG. 4C illustrates an exemplary slice 430 of the 3D mask image 136 of the 3D volume image that is generated by the landmark segmentation unit 330 from the ROI 412 of the slice 410 according to one embodiment of the present disclosure. As shown, an AC region 432, a PC region 434, and a third ventricle region 436 are segmented in the slice 430 of the 3D mask image 136. In one embodiment, the regions 432, 434, and 436 may be labeled with different indicators or colors such as red, green, and blue, respectively. Alternatively or additionally, the regions 432, 434, and 436 may be labeled with any suitable labels or indicators for identifying or distinguishing the regions from one another. Although the semantic segmentation unit 160 of the 3D volume image 200 is illustrated with the slices 410, 420, and 430 as an example, it should be appreciated that any suitable number of slices along any plane orientation of the 3D volume image 200 may be processed to generate the 3D mask image 136.

Figure 5:
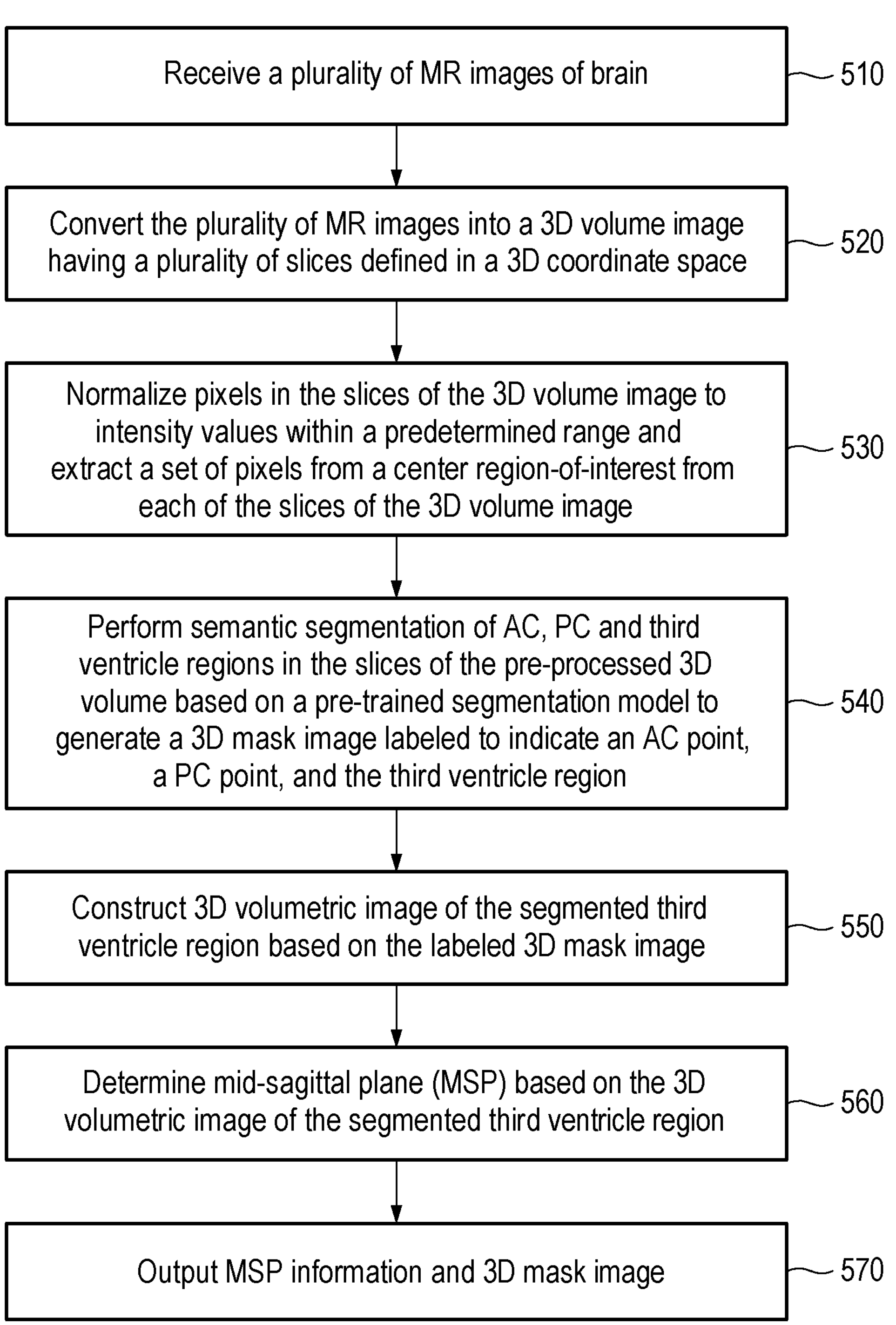
FIG. 5 shows a flowchart of a method for generating a 3D mask image labeled with AC, PC, and third ventricle regions from a plurality of MR images of a brain and volumetrically determining a mid-sagittal plane based on a 3D volumetric image of a segmented third ventricle region according to an embodiment of the present disclosure.

FIG. 5 shows a flowchart of a method, performed by the processor 110, for generating the 3D mask image 136 labeled with AC, PC, and third ventricle regions from the plurality of MR images 132 and volumetrically determining an MSP based on a 3D volumetric image of a segmented third ventricle region according to an embodiment of the present disclosure. In this method, the plurality of MR images 132, which are original MR images, may be received at 510 and converted to the 3D volume image 200 in a 3D coordinate space at 520. In this process, the MR images 132 may be mapped to the 3D coordinate space and interpolation may be performed to generate the 3D volume image 200.

At 530, the processor 110 may perform pre-processing on the 3D volume image 200 including normalization and patching. For example, the intensity values of the voxels in the 3D volume image 200 may be normalized to values within a predetermined range (e.g., 255 values). Further, a patching operation may be performed to extract a set of pixels from a center region of interest (ROI) from each of the slices of the 3D volume image 200 to reduce the size of the 3D volume.

Then at 540, the processor 110 performs semantic segmentation to detect and label the AC, PC, and third ventricle regions in the 3D volume image 200 based on the pre-trained segmentation model 134, thereby generating the 3D mask image 136 labeled with the regions. In one embodiment, an AC point and a PC point may be determined for the AC region and PC regions, respectively, based on the center of mass thereof and labeled in the 3D mask image 136. Based on the 3D mask image 136, the processor 110 constructs a 3D volumetric image of the segmented third ventricle region at 550. After constructing the 3D volumetric image of the segmented third ventricle region, the processor 110 determines the MSP based on the 3D volumetric image of the segmented third ventricle region at 560. In one embodiment, a plane that symmetrically divides the 3D volumetric image of the third ventricle region is designated as the MSP. Then at 570, the 3D mask image 136 and the MSP information 138 indicative of the MSP may be output to be transmitted to the server 140.

Figure 6:
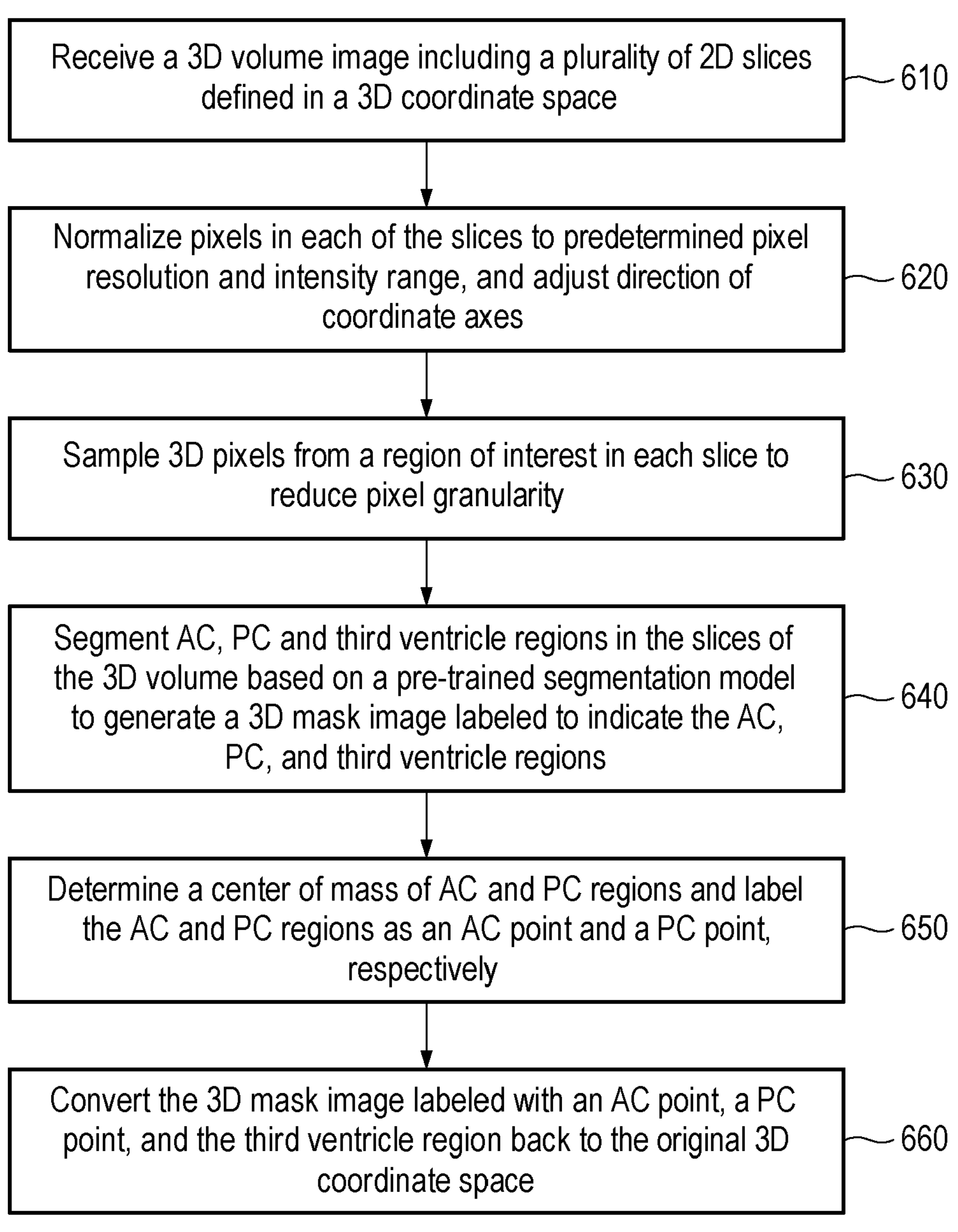
FIG. 6 shows a flowchart of a method, performed by a semantic segmentation unit for generating a 3D mask image labeled with AC, PC, and third ventricle regions and volumetrically determining an MSP according to an embodiment of the present disclosure.

FIG. 6 shows a flowchart of a method, performed by the semantic segmentation unit 160, for generating the 3D mask image 136 labeled with AC, PC, and third ventricle regions according to an embodiment of the present disclosure. In this method, upon receiving the 3D volume image 200, which is defined in a 3D coordinate space and includes a plurality of 2D slices, at 610, the semantic segmentation unit 160 may normalize the pixels in each of the slices to a predetermined pixel resolution and intensity range and adjust the direction of the coordinate axes for alignment at 620.

At 630, 3D pixels may be sampled or extracted from a center region of interest in each of the slices to reduce pixel granularity of the 3D volume image 200 to facilitate processing speed and reduce processing load. In one embodiment, the center region of interest may include the AC region, the PC region, and the third ventricle region.

At 640, the semantic segmentation unit 160 may detect and segment the AC, PC, and third ventricle regions in the extracted 3D volume image 200 based on the pre-trained segmentation model 134, to generate the 3D mask image 136 labeled to indicate the AC, PC, and third ventricle regions. Then at 650, the semantic segmentation unit 160 may determine a center of mass of each of the AC region and the PC region, and label the AC and PC regions in the 3D mask image as an AC point and a PC point, respectively, that correspond to the respective center of mass. The labeled 3D mask image 136 labeled with the AC point, PC point, and the third ventricle region may then be converted back to the original 3D coordinate space and provided to the MSP detection unit 170 at 660.

Figure 7:
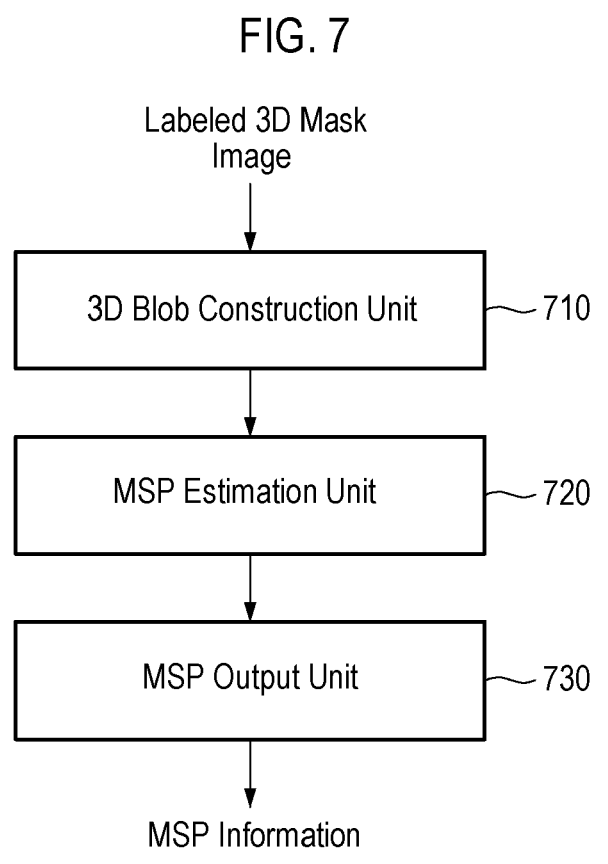

FIG. 7 shows a block diagram of the MSP detection unit 170 configured to determine an MSP from the 3D mask image 136 according to an embodiment of the present disclosure. The MSP detection unit 170 includes a 3D blob construction unit 710, an MSP estimation unit 720, and an MSP output unit 730. The 3D blob construction unit 710 is configured to receive the labeled 3D mask image 136, which includes the labeled AC, PC, and third ventricle regions, and construct a 3D volumetric image (e.g., a 3D blob) of the segmented third ventricle region.

The constructed 3D volumetric image is then provided to the MSP estimation unit 720, which determines the MSP based on the 3D volumetric image of the third ventricle region. In this process, the MSP estimation unit 720 determines a candidate plane that symmetrically divides the 3D volumetric image as the MSP based on a skeleton of the 3D volumetric image. The skeleton may be a medial plane and may be indicative of a major axis plane of the 3D volumetric image of the third ventricle region. The candidate plane may be aligned to or include a line connecting the AC region and the PC region. In one embodiment, the MSP estimation unit 720 may sequentially divide the 3D volumetric image by a plurality of candidate planes starting from the skeleton of the 3D volumetric image of the third ventricle region, until one of the candidate planes is determined to symmetrically divide the 3D volumetric image. The candidate plane determined to symmetrically divide the 3D volumetric image is then designated as the MSP.

In another embodiment, the 3D volumetric image of the third ventricle region may be sequentially rotated and translated in an angular increment with respect to the skeleton of the 3D volumetric image of the third ventricle region. At each rotation and translation position of the 3D volume image, the 3D volumetric image may be divided by a candidate plane. If the candidate plane is determined to symmetrically divide the 3D volumetric image into two symmetrical portions, the candidate plane is designated as the MSP. The MSP output unit 730 may then output MSP information indicative of the MSP such as an equation of the MSP or a set of coordinates defining the MSP.

Figure 8A:
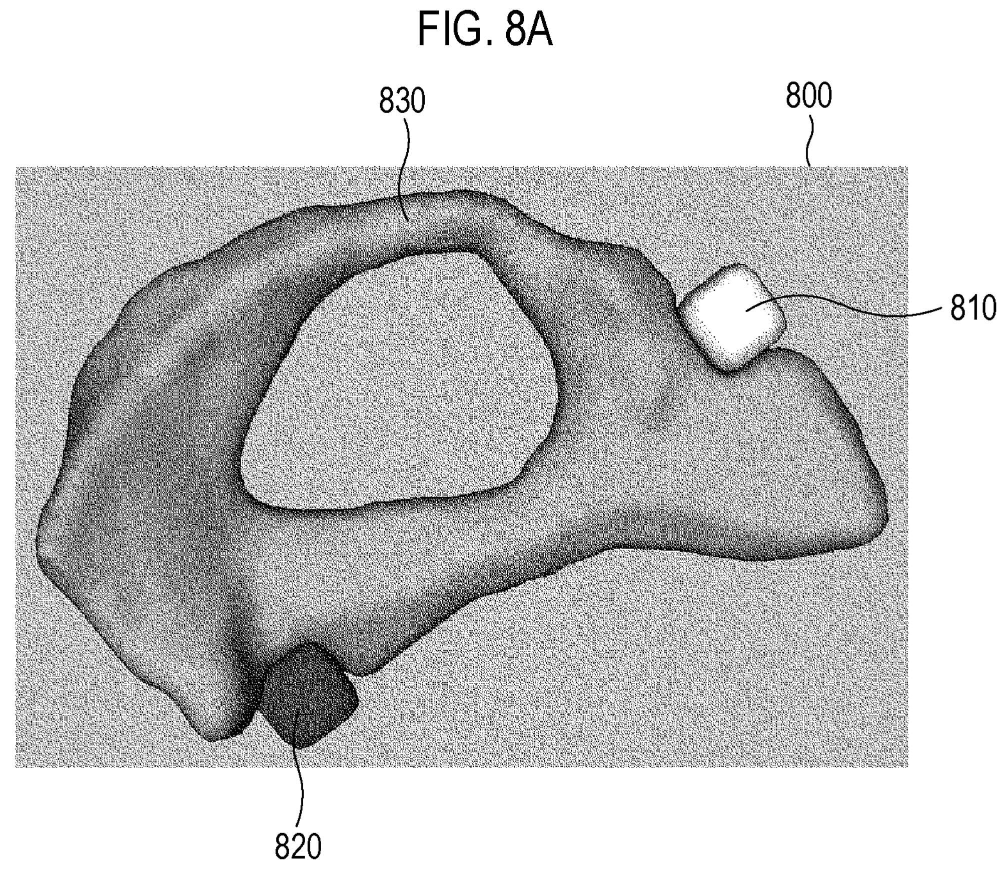
FIG. 8A shows a 3D volumetric image of a third ventricle region based on a labeled 3D mask image.

FIG. 8A shows a 3D volumetric image 800 (e.g., a 3D blob) that may be generated by the 3D blob construction unit 710 based on the labeled 3D mask image 136 including a plurality of slices (e.g., the slice 430 and the like) therein. The 3D volumetric image 800 includes a third ventricle region 830, an AC region 810, and a PC region 820. The AC region 810 and the PC region 820 may be two points, respectively, that define a reference line for determining the MSP. The AC region 810, PC region 820, and the third ventricle region 830 may also be labeled with indicators or colors such as red, green, and blue, respectively.

Figure 8B:
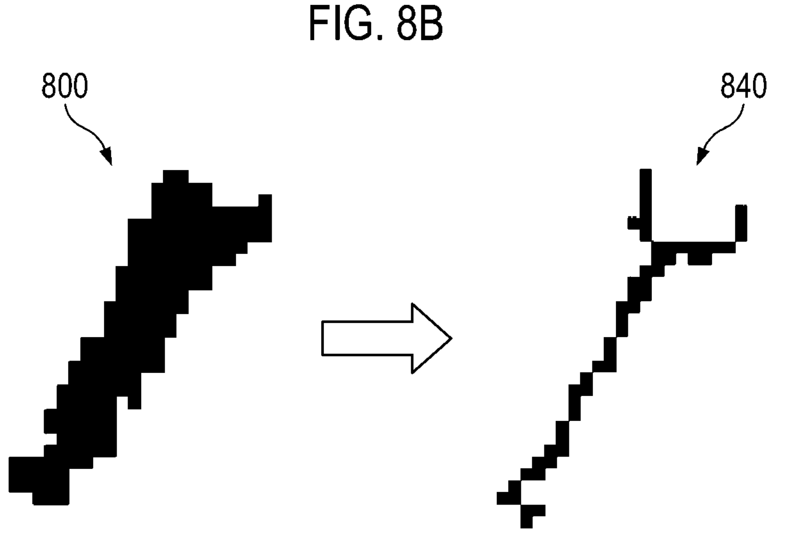
FIG. 8B illustrates an example of a skeleton of a 3D volumetric image of a third ventricle region according to an embodiment of the present disclosure.

In some embodiments, the third ventricle region 830 of the 3D volumetric image 800 may be modeled or represented as a skeleton. FIG. 8B illustrates an example of a skeleton 840 according to an embodiment of the present disclosure. For convenience of description, the third ventricle region 830 of the 3D volumetric image 800 is shown as a 2D pixelated image and the MSP estimation unit 720 may generate the skeleton 840 for the third ventricle region 830. For example, the MSP estimation unit 720 may determine a major axis plane of the third ventricle region 830 in the 3D volumetric image 800 and identify a set of pixels corresponding to the major axis plane. The set of identified pixels may then be selected to define the skeleton 840.

Figure 8C:
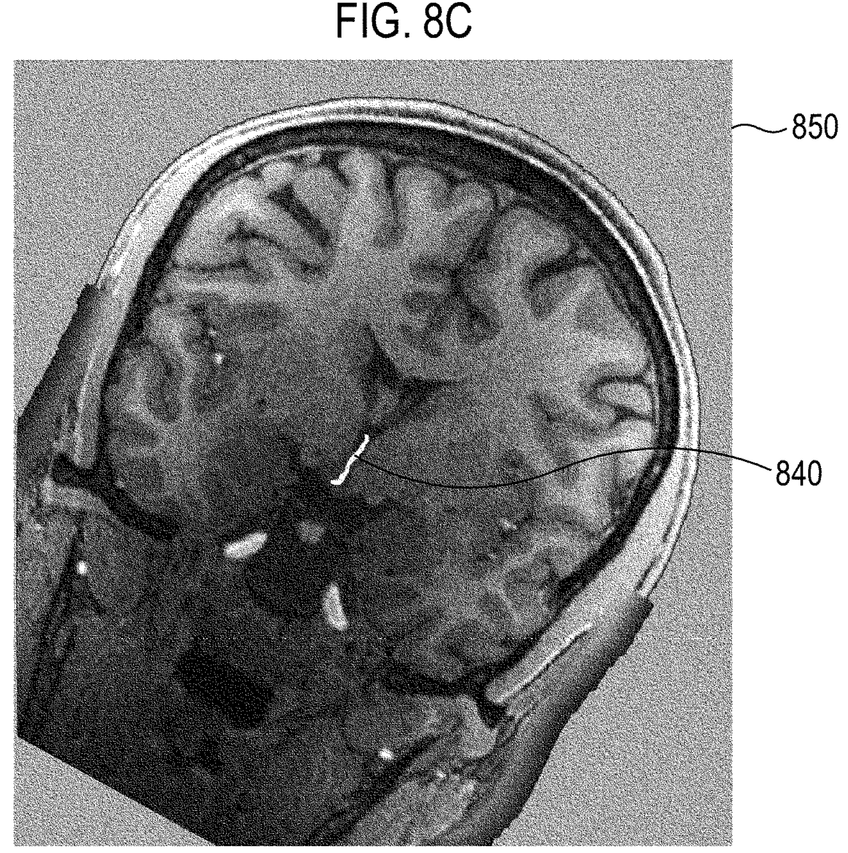
FIG. 8C illustrates a slice of a 3D volume image and a skeleton shown therein according to an embodiment of the present disclosure.
Figure 8D:
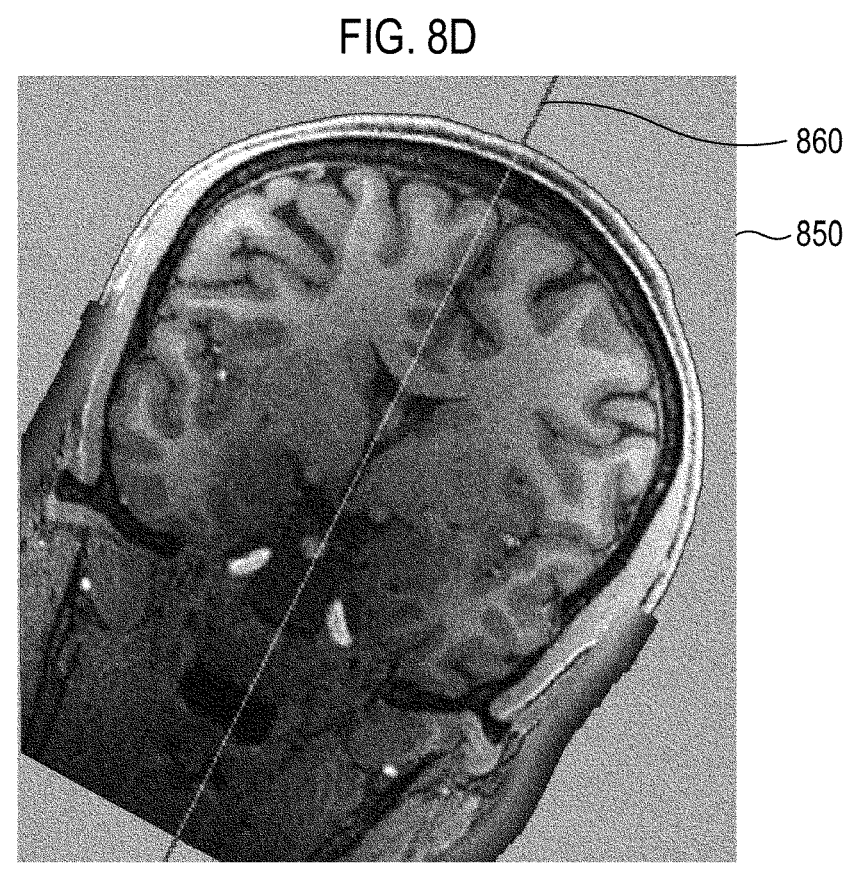

For ease of description, FIG. 8C shows a slice 850 of the 3D volume image 200 including an exemplary image of the skeleton 840 according to one embodiment. Starting from the skeleton 840 of the third ventricle region 830, the MSP estimation unit 720 may sequentially divide the 3D volumetric image of the third ventricle region 830 by one or more candidate planes by rotating and translating the 3D volumetric image. When one of the candidate planes is determined to symmetrically divide the 3D volumetric image of the third ventricle region 830, the MSP estimation unit 720 may determine the candidate plane as the MSP and output a plane equation of the MSP. FIG. 8D shows the slice 850 of the 3D volume image 200 including an MSP 860 that may be determined by the MSP estimation unit 720 according to an embodiment of the present disclosure.

Figure 9A:
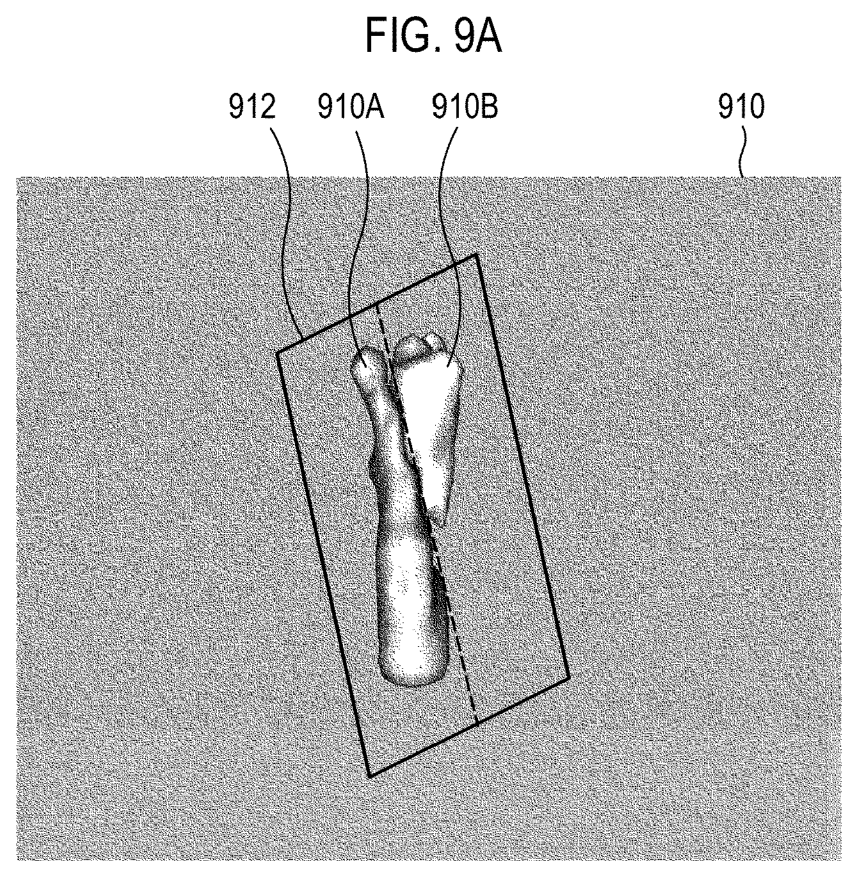
FIGS. 9A to 9C show exemplary 3D images of the 3D volumetric image divided into two portions.
Figure 9B:
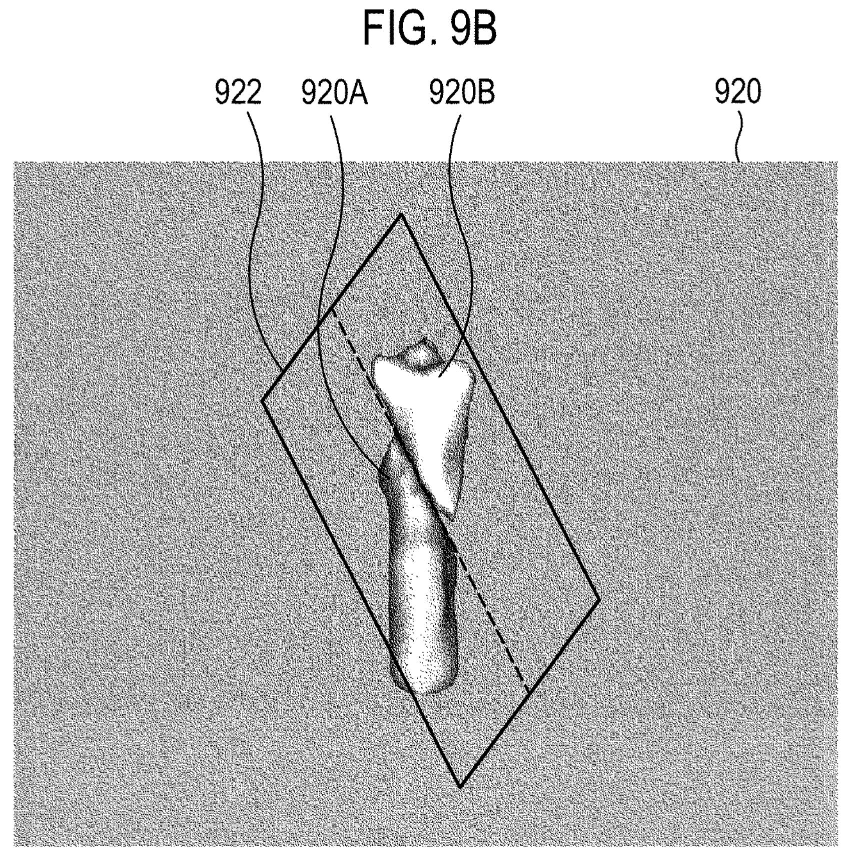
Figure 9C:
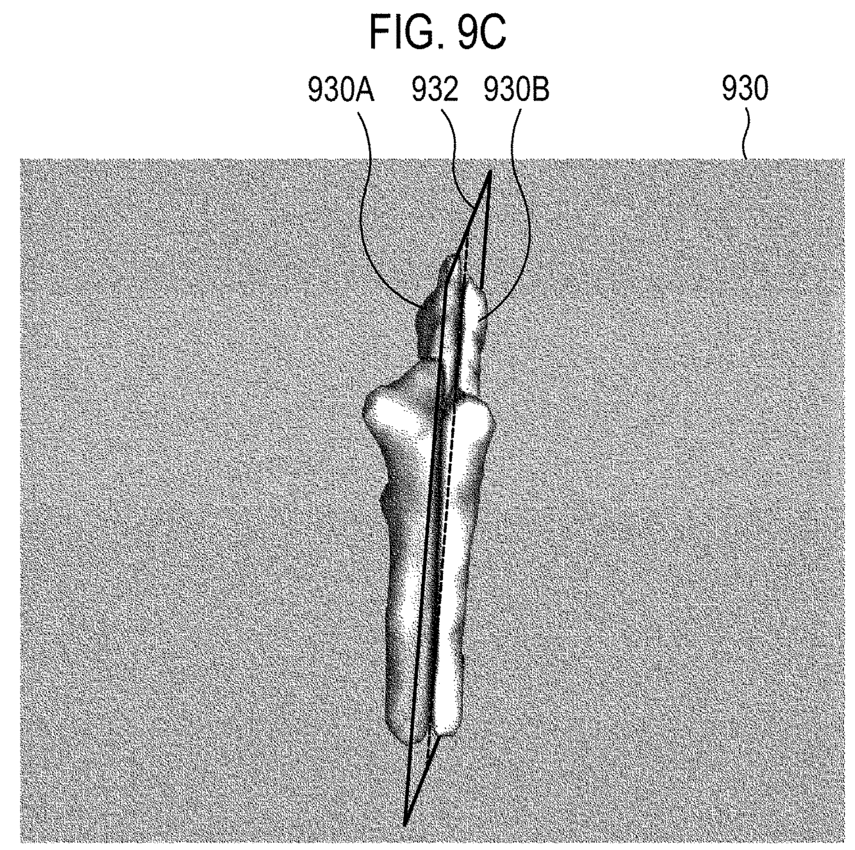

FIGS. 9A to 9C show exemplary 3D images 910, 920, and 930, respectively, of the third ventricle region 830 of the 3D volumetric image 800 divided into two portions. FIG. 9A illustrates the 3D image 910 in which the third ventricle region 830 is divided into two portions 910A and 910B, according to one embodiment of the present disclosure. In this case, the MSP estimation unit 720 may initially divide the third ventricle region 830 by a candidate plane 912 coinciding with the skeleton 840 and determine that the two portions 910A and 910B are not symmetric with respect to the candidate plane 912. The MSP estimation unit 720 may then select another candidate plane by rotating and translating the third ventricle region 830.

FIG. 9B shows the 3D image 920 in which the third ventricle region 830 is divided by a candidate plane 922 into two portions 920A and 920B according to one embodiment of the present disclosure. In this case, the MSP estimation unit 720 may also determine that the two portions 920A and 920B are not symmetric with respect to the candidate plane 922.

FIG. 9C shows the 3D image 930 in which the third ventricle region 830 is divided by a candidate plane 932 into two portions 930A and 930B according to one embodiment of the present disclosure. In this case, the MSP estimation unit 720 may determine that the two portions 930A and 930B are symmetric with respect to the candidate plane 932 and designate the candidate plane 932 as the MSP.

In one embodiment, the MSP estimation unit 720 may determine whether two divided portions (e.g., the two portions 910A and 910B, 920A and 920B, or 930A and 930B) of the third ventricle region 830 are symmetric by comparing the shape and the number of voxels of one portion with the shape and the number of voxels of the other portion. For example, the portions 910A and 910B in FIG. 9A are not similar to each other in their shapes and voxel numbers and thus are determined not to be symmetrical with respect to the candidate plane 912. As a further example, the portions 920A and 920B in FIG. 9B may be similar in voxel numbers but are not similar in shape, and thus are determined not be symmetrical with respect to the candidate plane 922. On the other hand, the portions 930A and 930B in FIG. 9C may be substantially similar in their shapes and voxel numbers, and thus may be determined to be symmetrical with respect to the candidate plane 932. Although symmetry is determined based on the shapes and voxel numbers of two divided portions of the third ventricle region 830, it may also be determined based on the shapes without considering voxel numbers of the two portions. As used herein, the phrase "substantially similar" means being within a threshold or predetermined degree of similarity. Accordingly, two shapes or the voxel numbers therein may be determined to be substantially similar when the two shapes or the numbers of voxels therein are within a threshold or predetermined degree of similarity. Further, as shown in FIGS. 9A to 9C, the candidate planes 912, 922, and 932 are illustrated for ease of description, and may or not may not be included in the 3D images 910, 920, and 930, respectively.

Figure 10:
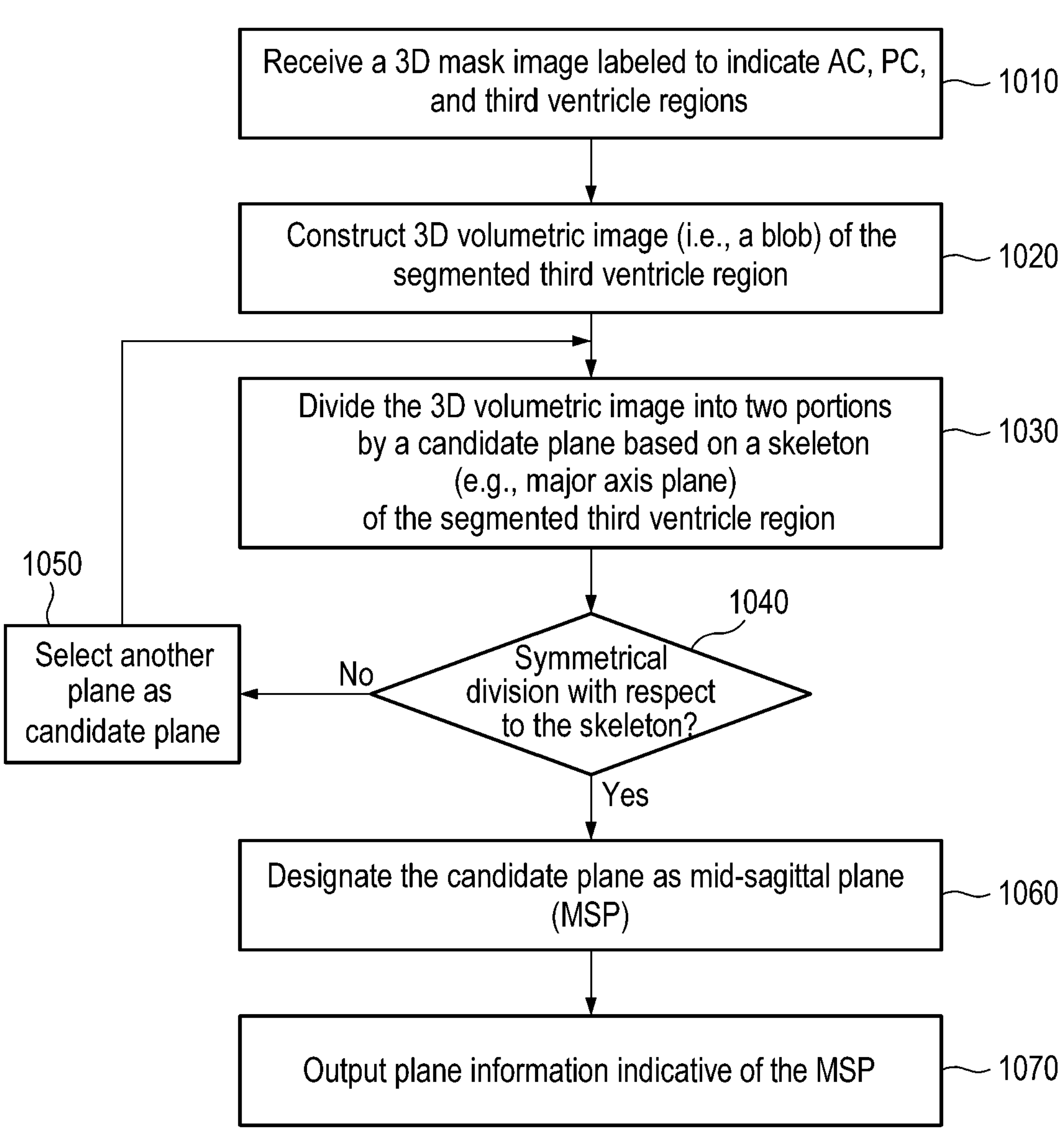
FIG. 10 shows a flowchart of a method performed by an MSP detection unit for determining a mid-sagittal plane that symmetrically divides a 3D volumetric image of a third ventricle region according to one embodiment of the present disclosure.

FIG. 10 shows a flowchart of a method performed by the MSP detection unit 170 for determining an MSP that symmetrically divides a 3D volumetric image of a third ventricle region according to one embodiment of the present disclosure. Initially, the 3D blob construction unit 710 receives the 3D mask image 136 labeled to indicate the AC, PC, and third ventricle regions at 1010. In one embodiment, the 3D mask image 136 may be labeled to indicate an AC point, a PC point, and the third ventricle region. The 3D blob construction unit 710 then constructs the 3D volumetric image (i.e., a 3D blob) of the segmented third ventricle region at 1020 based on the 3D mask image 136, and provides the 3D volumetric image to the MSP estimation unit 720.

Upon receiving the 3D volumetric image of the third ventricle region, the MSP estimation unit 720 divides the 3D volumetric image into two portions by a candidate plane at 1030, starting from a skeleton of the 3D volumetric image of the third ventricle region. For example, with reference to FIG. 9A, the MSP estimation unit 720 may divide the 3D volumetric image of the third ventricle region 830 initially into the two portions 910A and 910B by the candidate plane 912 that corresponds to the skeleton 840. Then at 1040, it is determined whether the candidate plane 912 symmetrically divides the 3D volumetric image of the third ventricle region 830 into two equal portions. In one embodiment, the candidate plane may be determined to symmetrically divide the 3D volumetric image of the third ventricle region 830 when the two portions are substantially similar in their shapes and voxel numbers with respect to the candidate plane. In the example of the 3D volumetric image 800 of FIG. 9A, the MSP estimation unit determines that the two portions 910A and 910B are not similar in shape and voxel numbers.

If the MSP estimation unit 720 determines that the candidate plane does not symmetrically divide the 3D volumetric image of the third ventricle region, another plane may be selected as a new candidate plane at 1050 and the 3D volumetric image of the third ventricle region may be divided by the new candidate plane at 1030. In one embodiment, the new candidate plane may be selected by rotating the 3D volumetric image of the third ventricle region 830 about a line connecting the AC and PC (AC-PC line) in an angular increment with respect to the skeleton 840. Since the candidate planes are chosen starting from the skeleton 840, the number of iterations or angular increments needed to determine a candidate plane that symmetrically divides the 3D volumetric image of the third ventricle 830 is reduced in comparison to a case of starting from a random candidate plane.

With reference to the example of FIG. 9A, the MSP estimation unit 720 may proceed to select the candidate plane 922 shown in FIG. 9B as a new candidate plane by rotating and translating the 3D volumetric image of the third ventricle region 830 at 1050. In the 3D volumetric image 920 in FIG. 9B, the MSP estimation unit 720 determines that the two portions 920A and 920B are not symmetric with respect to the candidate plane 922 since their shapes are not similar. Thus, the MSP estimation unit 720 may proceed to select the candidate plane 932 by rotating and translating the 3D volumetric image of the third ventricle region 830 in FIG. 9C, at 1050.

On the other hand, if the candidate plane is determined to symmetrically divide the 3D volumetric image of the third ventricle region at 1040, the MSP estimation unit 720 may designate the candidate plane as the MSP at 1060. In the example of FIG. 9C, the MSP estimation unit 720 divides the 3D volumetric image of the third ventricle region 830 into the two portions 930A and 930B, at 1030, based on the candidate plane 932 and then determines that the two portions 930A and 930B are symmetrical with respect to the candidate plane 932 at 1040. Thus, the candidate plane 932 is designated as the MSP at 1060.

The MSP output unit 730 may then output MSP information indicative of the MSP at 1070. In one embodiment, the plane information indicative of the MSP may be an equation or a set of coordinates defining the MSP, which may include a first coordinate indicative of the AC region, a second coordinate indicative of the PC region, and a third coordinate indicative of a point that defines the MSP together with the first and second coordinates.

In one embodiment, the MSP may be determined for each line of intersection between axial and coronal planes from the segmented 3D volumetric image (e.g., 3D blob). For example, the MSP detection unit 170 may estimate a plane starting from a skeleton such as a major axis plane of the 3D volumetric image of the third ventricle region that best fits all mid sagittal points using a model fitting tool such as RANSAC. Then, using inlier points obtained from the model fitting tool, the MSP detection unit 170 may use a singular value decomposition (SVD) method to estimate the final plane and designate the final plane as the MSP.

While the foregoing methods have been described with respect to particular embodiments, these methods may also be implemented as computer-readable code on a computer-readable recording medium. The computer-readable recording medium includes any kind of data storage devices that can be read by a computer system. Examples of the computer-readable recording medium includes ROM, RAM, CD-ROM, magnetic tape, floppy disk, optical data storage device and the like. Also, the computer-readable recoding medium can be distributed to the computer systems which are connected through a network so that the computer-readable codes can be stored and executed in a distribution manner. Further, the functional programs, codes and code segments for implementing the foregoing embodiments can easily be inferred by programmers in the art to which the present disclosure pertains.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A method, performed by a computer, for volumetrically determining a mid-sagittal plane (MSP) from a plurality of magnetic resonance (MR) images of a brain, the method comprising:

receiving the plurality of MR images;

converting the plurality of MR images into a 3D volume image defined in a 3D coordinate space;

performing semantic segmentation of an anterior commissure (AC) region, a posterior commissure (PC) region, and a third ventricle region in the 3D volume image based on a pre-trained segmentation model to generate a 3D mask image labeled with the AC region, the PC region, and the third ventricle region;

labeling an AC point, which corresponds to a center of mass of the AC region, as the AC region and a PC point, which corresponds to a center of mass of the PC region, as the PC region, in the 3D mask image;

constructing a 3D volumetric image of the segmented third ventricle region based on the labeled 3D mask image; and determining the MSP based on the 3D volumetric image of the third ventricle region, wherein the MSP is defined by:

a first coordinate indicative of the AC point, a second coordinate indicative of the PC point, and a third coordinate different from the first coordinate and the second coordinate.

2. The method of claim 1, wherein performing semantic segmentation comprises:

normalizing a plurality of pixels of each of a plurality of slices of the 3D volume image to intensity values within a predetermined range;

extracting a set of the plurality of pixels from a center region of interest in each of the plurality of slices of the 3D volume image; and segmenting the AC region, the PC region, and the third ventricle region of the normalized and extracted 3D volume image based on the pre-trained segmentation model to generate the 3D mask image labeled with the AC region, the PC region, and the third ventricle region.

3. The method of claim 2, further comprising:

outputting information indicative of the MSP; and outputting the 3D mask image labeled with the AC region, the PC region, and the third ventricle region.

4. The method of claim 3, wherein the information indicative of the MSP is an equation or a set of coordinates defining the MSP.

5. The method of claim 1, wherein determining the MSP comprises:

determining a candidate plane that symmetrically divides the 3D volumetric image of the third ventricle region based on a skeleton of the 3D volumetric image of the third ventricle region; and designating the candidate plane as the MSP.

6. The method of claim 1, wherein determining the MSP comprises:

dividing the 3D volumetric image of the third ventricle region into a first portion and a second portion by a candidate plane starting from a skeleton of the 3D volumetric image of the third ventricle region;

determining whether the candidate plane symmetrically divides the 3D volumetric image based on a shape and a number of voxels in the first portion and a shape and a number of voxels of the second portion; and upon determining that the candidate plane symmetrically divides the 3D volumetric image, designating the candidate plane as the MSP.

7. The method of claim 6, wherein the candidate plane includes a line connecting the AC region and the PC region.

8. The method of claim 1, wherein determining the MSP comprises:

sequentially dividing the 3D volumetric image of the third ventricle region by a plurality of candidate planes starting from a skeleton of the 3D volumetric image of the third ventricle region until one of the plurality of candidate planes is determined to symmetrically divide the 3D volumetric image of the third ventricle region; and designating the one of the plurality of candidate planes as the MSP.

9. The method of claim 8, wherein sequentially dividing the 3D volumetric image of the third ventricle region comprises:

sequentially rotating and translating the 3D volumetric image of the third ventricle region in an angular increment with respect to the skeleton of the 3D volumetric image of the third ventricle region; and at each rotation and translation position of the 3D volumetric image, dividing the 3D volumetric image by one of the candidate planes; and determining whether the one of the candidate planes symmetrically divides the 3D volumetric image; and upon determining that one of the candidate planes symmetrically divides the 3D volumetric image of the third ventricle region, designating the candidate plane as the MSP.

10. An image processing device for volumetrically determining a mid-sagittal plane (MSP) from a plurality of magnetic resonance (MR) images of a brain, comprising:

a processor configured to:

receive the plurality of MR images;

convert the plurality of MR images into a 3D volume image defined in a 3D coordinate space;

perform semantic segmentation of an anterior commissure (AC) region, a posterior commissure (PC) region, and a third ventricle region in the 3D volume image based on a pre-trained segmentation model to generate a 3D mask image labeled with the AC region, the PC region, and the third ventricle region;

label an AC point, which corresponds to a center of mass of the AC region, as the AC region and a PC point, which corresponds to a center of mass of the PC region, as the PC region, in the 3D mask image;

construct a 3D blob of the segmented third ventricle region based on the labeled 3D mask image; and determine the MSP based on the 3D blob of the third ventricle region, wherein the MSP is defined by:

a first coordinate indicative of the AC point, a second coordinate indicative of the PC point, and a third coordinate different from the first coordinate and the second coordinate.

11. The image processing device of claim 10, wherein the processor is configured to perform semantic segmentation by:

normalizing a plurality of pixels of each of a plurality of slices of the 3D volume image to intensity values within a predetermined range;

extracting a set of the plurality of pixels from a region of interest in each of the plurality of slices of the 3D volume image; and segmenting the AC region, the PC region, and the third ventricle region of the normalized and extracted 3D volume image based on the pre-trained segmentation model to generate the 3D mask image labeled with the AC region, the PC region, and the third ventricle region.

12. The image processing device of claim 10, wherein the processor is configured to determine the MSP by:

determining a candidate plane that symmetrically divides the 3D blob of the third ventricle region based on a skeleton of the 3D blob of the third ventricle region; and designating the candidate plane as the MSP.

13. The image processing device of claim 12, the processor is further configured to:

output information indicative of the MSP; and output the 3D mask image labeled with the AC region, the PC region, and the third ventricle region.

14. The image processing device of claim 13, wherein the information indicative of the MSP is an equation or a set of coordinates defining the MSP.

15. The image processing device of claim 10, wherein the processor is configured to determine the MSP by:

dividing the 3D blob of the third ventricle region by a candidate plane starting from a skeleton of the 3D blob of the third ventricle region;

determining whether the candidate plane symmetrically divides the 3D blob; and upon determining that the candidate plane symmetrically divides the 3D blob, designating the candidate plane as the MSP.

16. The image processing device of claim 15, wherein the candidate plane includes a line connecting the AC region and the PC region.

17. The image processing device of claim 10, wherein the processor is configured to determine the MSP by:

sequentially dividing the 3D blob of the third ventricle region by a plurality of candidate planes starting from a skeleton of the 3D volumetric image of the third ventricle region until one of the plurality of candidate planes is determined to symmetrically divide the 3D blob of the third ventricle region; and designating the one of the plurality of candidate planes as the MSP.

18. A non-transitory computer-readable storage medium comprising instructions for volumetrically determining a mid-sagittal plane (MSP) from a plurality of magnetic resonance (MR) images of a brain, the instructions causing a processor to perform operations comprising:

receiving the plurality of MR images;

converting the plurality of MR images into a 3D volume image defined in a 3D coordinate space;

performing semantic segmentation of an anterior commissure (AC) region, a posterior commissure (PC) region, and a third ventricle region in the 3D volume image based on a pre-trained segmentation model to generate a 3D mask image labeled with the AC region, the PC region, and the third ventricle region;

labeling an AC point, which corresponds to a center of mass of the AC region, as the AC region and a PC point, which corresponds to a center of mass of the PC region, as the PC region, in the 3D mask image;

constructing a 3D volumetric image of the segmented third ventricle region based on the labeled 3D mask image; and determining the MSP based on the 3D volumetric image of the third ventricle region, wherein the MSP is defined by:

a first coordinate indicative of the AC point, a second coordinate indicative of the PC point, and a third coordinate different from the first coordinate and the second coordinate.

19. The medium of claim 18, wherein performing semantic segmentation comprises:

normalizing a plurality of pixels of each of a plurality of slices of the 3D volume image to intensity values within a predetermined range;

extracting a set of the plurality of pixels from a center region of interest in each of the plurality of slices of the 3D volume image; and segmenting the AC region, the PC region, and the third ventricle region of the normalized and extracted 3D volume image based on the pre-trained segmentation model to generate the 3D mask image labeled with the AC region, the PC region, and the third ventricle region.

20. The medium of claim 18, wherein determining the MSP comprises:

determining a candidate plane that symmetrically divides the 3D volumetric image of the third ventricle region based on a skeleton of the 3D volumetric image of the third ventricle region; and designating the candidate plane as the MSP.

21. The medium of claim 18, further comprising:

outputting information indicative of the MSP; and outputting the 3D mask image labeled with the AC region, the PC region, and the third ventricle region.

22. The medium of claim 21, wherein the information indicative of the MSP is an equation or a set of coordinates defining the MSP.

23. The medium of claim 18, wherein determining the MSP comprises:

sequentially dividing the 3D volumetric image of the third ventricle region by a plurality of candidate planes starting from a skeleton of the 3D volumetric image of the third ventricle region until one of the plurality of candidate planes is determined to symmetrically divide the 3D volumetric image of the third ventricle region; and designating the one of the plurality of candidate planes as the MSP.

* * * * *